United States Patent [19]

Chitnis et al.

[11] Patent Number: 5,110,776
[45] Date of Patent: May 5, 1992

[54] CRACKING CATALYSTS CONTAINING PHOSPHATE TREATED ZEOLITES, AND METHOD OF PREPARING THE SAME

[75] Inventors: Girish K. Chitnis, Chadds Ford, Pa.; Joseph A. Herbst, Turnersville, N.J.

[73] Assignee: Mobil Oil Corp., Fairfax, Va.

[21] Appl. No.: 667,853

[22] Filed: Mar. 12, 1991

[51] Int. Cl.$^5$ .................. B01J 29/08; C10G 11/05
[52] U.S. Cl. ........................... 502/64; 502/60; 502/77; 502/79; 502/85; 502/86; 502/214; 208/114; 208/120
[58] Field of Search ............... 423/328, 329; 502/85-86, 208, 214, 77, 79, 60, 64; 208/114, 120

[56] References Cited

U.S. PATENT DOCUMENTS

| | | | |
|---|---|---|---|
| 3,354,096 | 11/1967 | Young | 502/73 |
| 3,867,279 | 2/1975 | Young | 208/114 |
| 4,180,471 | 12/1979 | Schrodter et al. | 423/328 |
| 4,228,036 | 10/1980 | Swift et al. | 502/65 |
| 4,325,813 | 4/1982 | Brown et al. | 208/120 |
| 4,379,761 | 4/1983 | Olson et al. | 502/214 |
| 4,430,199 | 2/1984 | Durante et al. | 208/114 |
| 4,454,241 | 6/1984 | Pine et al. | 502/214 |
| 4,456,780 | 6/1984 | Young | 502/214 |
| 4,498,975 | 2/1985 | Pine et al. | 208/114 |
| 4,567,152 | 1/1986 | Pine | 502/64 |
| 4,584,091 | 4/1986 | Pine | 208/114 |
| 4,605,637 | 8/1986 | Chang et al. | 423/328 |
| 4,716,135 | 12/1987 | Chen | 502/214 |
| 4,728,629 | 3/1988 | Bertus et al. | 502/62 |
| 4,839,319 | 6/1989 | Schuette et al. | 502/64 |
| 4,873,211 | 10/1989 | Walker et al. | 502/64 |
| 4,970,183 | 11/1990 | Nakamoto et al. | 502/214 |
| 4,975,180 | 12/1990 | Eberly | 208/114 |
| 4,977,122 | 12/1990 | Eberly | 502/69 |

FOREIGN PATENT DOCUMENTS

| | | |
|---|---|---|
| 0176150 | 4/1986 | European Pat. Off. |
| 0397183 | 11/1990 | European Pat. Off. |
| 0403141 | 12/1990 | European Pat. Off. |
| 62-212219 | 9/1987 | Japan . |
| 63-50313 | 3/1988 | Japan . |
| 63-197549 | 8/1988 | Japan ............ 502/214 |

OTHER PUBLICATIONS

Gitzen et al., "Phosphate-Bonded Alumina Castables: Some Properties and Applications", *Ceramic Bulletin*, 35 (6), 217-223 (1956).

Kingery, "Fundamental Study of Phosphate Bonding in Refractories: I. Literature Review, II, Cold-Setting Properties, III. Phosphate Adsorption by Clay and Bond Migration", *Journal of American Ceramics Society*, 33 (8), 239-250 (1950).

*Primary Examiner*—R. Bruce Breneman
*Attorney, Agent, or Firm*—Alexander J. McKillop; Charles J. Speciale; Dennis P. Santini

[57] ABSTRACT

A process for preparing a zeolite containing catalyst which has improved attrition resistance, and causes improved octane with no appreciable change in dry gas and coke make when used during catalytic cracking processes is disclosed. The catalyst is prepared by modifying the zeolite with a phosphate containing solution. The zeolite preferably includes an REY large pore zeolite. Treatment of the zeolite is best accomplished in an aqueous solution, at a pH range from about 2 to about 6, containing a water soluble phosphate compound. The phosphate treatment of the zeolite is carried out by deagglomerating the zeolite in an aqueous mixture in the presence of an aqueous phosphate containing solution, such as an aqueous solution of ammonium monohydrogen phosphate. The aqueous mixture containing phosphate modified zeolite is then combined with matrix precursors to form a slurry. The slurry is preferably spray dried to form the catalyst having a diameter less than 200 microns. The novel catalyst is used in the catalytic cracking of hydrocarbons in an FCC, moving bed or other catalytic cracking apparatus. The catalyst can be used for treating resids in which the hydrocarbon feedstock has a higher average molecular weight, a lower API gravity and/or a higher metals content than gas oil.

36 Claims, No Drawings

CRACKING CATALYSTS CONTAINING PHOSPHATE TREATED ZEOLITES, AND METHOD OF PREPARING THE SAME

FIELD OF THE INVENTION

This invention relates to catalytic cracking of hydrocarbons. More particularly, this invention relates to the preparation of novel catalytic cracking catalysts containing phosphate pretreated zeolites. These catalysts are highly attrition resistant and have the attentive benefits of improved conversion, low coke and dry gas formation and improved octane yields in catalytic cracking of crude oil.

BACKGROUND OF THE INVENTION

Catalytic cracking operations are commercially employed in the petroleum refining industry to produce useful products, such as high quality gasoline and fuel oils from hydrocarbon-containing feeds. The endothermic catalytic cracking of hydrocarbons is most typically practiced in accordance with two known catalytic cracking operations, namely, fluid catalytic cracking (FCC) and moving bed catalytic cracking.

Generally, both fluid catalytic cracking and moving bed operations are commercially practiced in a cycling mode. During these operations the hydrocarbon feedstock is contacted with hot, active, solid particulate catalyst without added hydrogen at rather low pressures of up to about 50 psig and temperatures sufficient to support the desired cracking. As the hydrocarbon feed is cracked in the presence of cracking catalyst, to form more valuable and desirable products, undesirable carbonaceous residue known as "coke" is deposited on the catalyst. The coke contains carbon as well as metals that are present in the feedstock.

In FCC operations, the catalyst is a fine powder of about 20-200 microns in diameter. The fine powder is propelled upwardly through a riser reaction zone, fluidized and thoroughly mixed in the hydrocarbon feed. The hydrocarbon feed is cracked at high temperatures by the catalyst and separated into various hydrocarbon products. The coked catalyst particles are separated from the cracked hydrocarbon products, and after purging, are transferred into a regenerator where the coke is burnt off to regenerate the catalyst. The regenerated catalyst then flows downwards from the regenerator to the base of the riser.

The cycles of cracking and regeneration at high flow rates and temperatures have a tendency to physically break down the catalyst into smaller particles, called "fines" which have a diameter of up to 20 microns as compared to the average diameter of the catalyst particle of about 60 to about 90 microns. Excessive generation of catalyst fines increases the cost of catalyst to the refiner.

Commercial catalytic cracking units include cyclones and electrostatic precipitators to prevent fines from becoming airborne. Additionally, the catalyst particles cannot be too large in diameter, or the particles may not be sufficiently fluidized. Therefore, the catalysts are maintained under 120 to 150 microns in diameter.

In determining the unit retention of catalysts, and accordingly their cost efficiency, attrition is a key parameter. While the size of the particles can be controlled relatively easily by the initial spray drying of the catalyst, if the attrition index is high, then the average particle size may quickly diminish. In such situations, the catalytic cracking unit may, therefore, produce a large amount of the 0-20 micron fines which should not be released into the atmosphere.

Additionally, deposition of coke on the catalyst particles is generally considered undesirable for two reasons: First, it inevitably results in decline in catalytic activity to a point where the catalyst is considered to have become "spent"; and second, coke generally forms on the catalyst at the expense of the more desired liquid products. To regenerate the catalytic activity, the hydrocarbon residues of the coke must be burnt off of the "spent" catalyst at elevated temperatures in a regenerator.

Current worldwide refinery trends indicate a continuing need to process heavier feed stock. As a result, many refineries will be processing feedstock containing resids or deeper cut gas oils which have high metals contents. The enhancement of octane produced in catalytic cracking operations is an important goal in the preparation of zeolite containing catalysts. The environmental regulations in the United States and abroad, and the phaseout of lead additives for gasolines in both the U.S. and abroad, requires refineries to use catalysts which produce increased octane gasolines from heavier metals contaminated feedstock.

Accordingly, one object of the present invention is to provide a zeolite containing catalyst preparation which has improved attrition resistance.

Another object of the present invention is to provide attrition resistant catalysts which also provide the benefit of increased octane performance.

A further object of the present invention is to provide attrition resistant and octane enhancing catalysts containing REY type zeolites.

A still further object of the present invention is to provide attrition resistant and octane enhancing catalysts without further increasing coke or dry gas make.

SUMMARY OF THE INVENTION

These and other objects are achieved by the present invention which provides a process for preparing a zeolite containing catalyst which has improved attrition resistance, and causes improved octane with no appreciable change in dry gas and coke make when used during catalytic cracking processes. The catalyst is prepared by modifying the zeolite with a phosphate containing solution. The zeolite may include large pore zeolites such as X, Y, USY, REX, REY, RE-USY, dealuminated Y and silica-enriched dealuminated Y; or intermediate pore zeolites such as ZSM-5, ZSM-11, ZSM-22, ZSM-23, ZSM-35, ZSM-48 and ZSM-57; or small pore zeolites such as erionite and ZSM-34, and mixtures thereof, preferably an REY large pore zeolite. Treatment of the zeolite is best accomplished in an aqueous solution, at a pH range from about 2 to about 6, containing a water soluble phosphate compound. The phosphate treatment of the zeolite is carried out by deagglomerating the zeolite, preferably in an aqueous slurry in the presence of the phosphate containing solution, such as a solution of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite, and mixtures thereof. The phosphate modified zeolite is then combined with matrix precursor to form a slurry. The slurry is preferably spray dried to form the catalyst, most preferably having a diameter less than 200 microns. The novel catalyst, prepared as described above, is used in the catalytic cracking of a hydrocarbon feedstock by contacting the hydrocarbon feedstock under suitable catalytic cracking conditions in an FCC, moving bed or other catalytic cracking apparatus. The catalyst can be used for treating resids in which the hydrocarbon feedstock has a higher average molecular weight, a lower API gravity and/or a higher metals content than gas oil.

For a better understanding of the present invention, reference is made to the following description and examples, taken in conjunction with the accompanying tables, the scope of which is pointed out in the appended claims.

DETAILED DESCRIPTION OF THE INVENTION

The present invention provides a process for preparing a zeolite containing catalyst having improved attrition resistance, and causes improved octane with no appreciable change in dry gas and coke make during catalytic cracking of crude oils. The process of the present invention includes pretreatment and modification of the zeolite with a phosphate containing aqueous solution in the pH range from about 2 to about 6. The zeolite may include large pore zeolites such as Rare Earth X and Y zeolites, USY, dealuminated Y and silica-enriched dealuminated Y, and intermediate pore zeolites including ZSM-5, ZSM-11, ZSM-22, ZSM-23, ZSM-35, ZSM-48, ZSM-57 and small pore zeolites including erionite, ZSM-34, and mixture of these zeolites. Using REY and USY as examples, phosphate pretreatment was shown to provide increased attrition resistance. Surprisingly however, phosphate pretreatment of REY zeolites also caused improved octane with no appreciable change in dry gas and coke make during catalytic cracking. By comparison, the phosphate pretreatment of USY zeolites, although resulting in improved attrition resistance, did not cause an appreciable octane gain. The phosphate containing solution may include any water soluble inorganic phosphate salt which produces reactive phosphate ions at the pH range, from about 2 to about 6, at which the zeolite is treated. The phosphate containing solution may include ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite or mixtures thereof.

Any means for intimately contacting the phosphate containing solution with a zeolite at a acidic pH will probably improve the attrition resistance of the catalyst. It is preferred, however, that the zeolite and phosphate containing solution is deagglomerated as an aqueous slurry, e.g. by ballmilling. This process distributes the zeolite into a uniform slurry and allows the leaching of aluminum from the framework of the zeolite and the formation of an aluminum phosphate compound on the surface of the zeolite. It is also preferred that the phosphate solution is dissolved in a suitable dispersant and water prior to contacting with the zeolite. The preferred phosphate solution comprises an aqueous solution of ammonium dihydrogen phosphate at a pH of about 2 to 6. The phosphate compound is preferably combined with the zeolite in a ratio of from about 2 grams to about 15 grams of phosphate compound as phosphorus, per 100 grams of the zeolite, measured by dry weight.

In the process of the present invention, after the zeolite has been suitably pretreated with the phosphate containing solution for a sufficient time to modify the zeolite, the zeolite phosphate treated slurry is combined with a slurry of matrix precursors that has been suitably prepared, as described in the examples. The zeolite/matrix slurry suspension is sufficiently mixed before spray drying. The catalyst slurry is spray dried to form fluidizable catalyst particles, preferably less than 200 microns in diameter.

The catalyst prepared in accordance with the process of the present invention is used in a catalytic cracking process by contacting hydrocabon feedstock, such as gas oil, or resid under appropriate catalytic cracking conditions in the presence of the catalytic of the present invention, preferably containing the phosphate pretreated REY zeolite. The use of the catalyst of the present invention in catalytic cracking of gas oil or resids results in gasolines having increased octane and no appreciable change in dry gas and coke make, and in a lower rate of attrition of the cracking catalyst. Thus, the preparation of cracking catalysts of the present invention, preferably using REY zeolites, in addition to improving attrition resistance also mimics the performance of catalysts containing USY zeolites.

The teachings of the present invention, may also be utilized by not only pretreating the zeolite with the phosphate solution, but also separately treating the matrix precursors with the phosphate to provide even higher attrition resistance. Phosphate treatment of the matrix component, however, does not improve the octane performance of the catalyst, as shown by the examples. Improved attrition resistance, of course, is also obtained by phosphate treatment of the aluminum oxide containing matrix material, forming the aluminum phosphate "glue" in the matrix.

We hypothesize that the improved attrition resistance is caused by the formation of aluminum phosphate gel. The gel may form on the zeolite surface by leaching of framework aluminum in the acidic medium and may act as a binder. We also hypothesize that the depletion of framework aluminum in the zeolite, results in the improved octane observed when the catalysts of the present invention are utilized in catalytic cracking of gas oil or resids. Accordingly, the preferred zeolite to be used in the present invention should have a low framework silica to alumina ratio, such as the ratio present in the Rare Earth Y (REY) type zeolites.

We also hypothesize that another probable reason for the increased octane performance of the catalyst of the present invention is the passivation by the phosphate ions of sodium. Metals like sodium ordinarily poison the catalyst, causing reduced octane during catalytic cracking. Thus, by removing or locking up sodium and other metals in the catalyst, such as nickel and vanadium, the phosphate pretreated zeolites in the catalyst produce higher octane without increased coke or dry gas make. We believe that either one, or both of these mechanisms may be acting synergistically, to provide the benefits observed in catalytic cracking with the catalyst of the present invention.

Accordingly, the catalyst of the present invention is particularly suited for cracking heavy feedstocks such as resids, which have higher average molecular weight and lower API gravity than gas oils. It is predicted that in the future these heavier feedstocks will comprise a greater portion of FCC feedstocks in oil refineries.

The following examples further illustrate the various features of the present invention, and are not intended in any way to limit the scope of the invention which is defined in the appended claims.

EXAMPLE 1

A control REY catalyst containing (on the basis of weight) 25% REY, 45.3% silica 3.4% alumina and 26.3% kaolin clay was prepared in accordance with the following method A batch of REY zeolite (SMR 6-1801, Davison Chemical Division of W. R. Grace & Co., Baltimore, Md.) weighing 750 grams (by dry weight) was mixed with 4.5 grams of dispersant, i.e., Marasperse N-22 (Reed-Lignin Inc., Greenwich, Conn.) and 1338 grams of DI water and ballmilled in a one-gallon porcelain ballmill containing 7.8 lbs. of ½ inch agate stones. After 16 hours, 1638 grams of DI rinse water was added. In a separate stirred vessel, 1736 gms of Kaolin clay (Georgia Kaolin Co., Inc., Elizabeth, N.J.) 86.16% solids, was mixed with 8973.5 grams of sodium silicate obtained as N-Clear (PQ Corporation, Valley Forge, Pa.) containing 28.8% $SiO_2$, 8.8% $Na2O$, and mixed with 94.1 lbs of water. The resulting slurry was successively neutralized by 844 grams of 96.2% $H_2SO_4$ and 12.85 lbs of aluminum sulfate (General Chemicals Co., Morristown, N.J.) as a solution containing 193 gms $Al_2O_3$. To this slurry, 15.7 lbs of the zeolite slurry, prepared above, (20.11% solids) was added and homogenized. The resulting slurry was dewatered, reslurried and spray-dried. The spray dryer (Komline-Sanderson, Peapack, N.J.) is operated at approximately 6 psig air pressure, with a 0.06 inch nozzle at about 250 cc/min. feed-rate using a Moyno feed pump (Springfield, Ohio).

Examples 2-5 describe the phosphate pretreatment of the REY zeolite component during the initial ballmilling step in accordance with the present invention.

EXAMPLE 2

The procedure described in Example 1 was modified by adding 5.76 grams ammonium dihydrogen phosphate $NH_4H_2PO_4$(98% solids, Alfa Products, Ward Hill, Mass.) per 100 grams REY zeolite (by dry weight) during the initial ballmilling step.

EXAMPLE 3

The procedure described in Example 1 was modified by adding 11.52 grams ammonium dihydrogen phosphate per 100 grams REY zeolite (by dry weight) during the initial ballmilling step (2× the phosphate level in Example 2), in accordance with the present invention.

EXAMPLE 4

The procedure described in Example 1 was modified by adding 23.15 grams ammonium dihydrogen phosphate per 100 grams REY zeolite (by dry weight) during the initial ballmilling step (4× the phosphate level in Example 2), in accordance with the present invention.

EXAMPLE 5

The procedure described in Example 1 was modified by adding 46.31 grams ammonium dihydrogen phosphate per 100 grams REY zeolite (by dry weight) during the initial ballmilling step (8× the phosphate level in Example 2), in accordance with the present invention.

EXAMPLE 6

This example describes the preparation of a catalyst in which the clay component was peptized with $H_3PO_4$ (phosphate) solution. The procedure described in Example 1 was modified by peptizing clay with 5.0 grams of 86.1% $H_3PO_4$ per 100 grams of clay (by dry weight) at the start of the gel-clay slurry preparation procedure. This procedure results in improved bonding of the clay component. The phosphate component, however, is locked into the clay portion of the matrix where it does not benefit the catalytic activity of the zeolite.

EXAMPLE 7

This example describes the preparation of a catalyst in which phosphate has been added to the entire matrix including the clay component. The procedure described in Example 1 was modified by substituting the same gram equivalents of $H_3PO_4$ for $H_2SO_4$ during the neutralization step of the clay slurry preparation.

EXAMPLE 8

This example describes the preparation of a catalyst in which phosphate has been added to both the zeolite and the matrix. The catalyst of Example 1 was post-impregnated with 1N ammonium dihydrogen phosphate solution to incipient wetness. The catalyst was subsequently dried.

EXAMPLE 9

This example describes the preparation of a phosphate pretreated USY zeolite (rather than REY) containing catalyst. Accordingly, the procedure in Example 3 was modified by substituting the same dry weight of USY zeolite (Z-14 US, Davison) for REY zeolite.

EXAMPLE 10

This example serves as a control for Example 9. Accordingly, the procedure in Example 1 was modified by substituting the same by weight of USY zeolite for REY zeolite.

EXAMPLE 11

Another control catalyst was made, as in Example 10, which contained the same dry weight of USY zeolite (SMR 6-1709, Davison Chemical Co.). The catalyst was ion-exchanged with $RE_2O_3$ solution (Davison Specialty Chemical Co., Baltimore, Md.) to give 2.9% (by weight on dry basis) RE2O3 on the finished catalyst.

EXAMPLE 12

This example describes the preparation of a catalyst in which the clay component was treated with ammonium dihydrogen phosphate during the gel-clay slurry preparation. The catalyst was prepared with the nominal composition (by weight) of 24% REY, 43.7% silica, 3.3% alumina, 25.4% Kaolin clay and 3.6% phosphorous according to the following procedure:

A batch of REY zeolite, (Davison) weighing 750 grams (by dry weight) was mixed with 2.25 grams of Marasperse N-22 dispersant (Reed-Lignin Inc.) and 860 grams of DI water and ballmilled in a 1-gallon porcelain ballmill containing 7.8 pounds of ½ inch agate stones. After 16 hours, 1638 grams of DI rinse water was added. In a separate stirred vessel, 456.5 grams of Kaolin clay (Georgia Kaolin Co.) 86.16% solids, was added to 2360 grams of N-Clear (PQ Corporation) containing 28.8% $SiO_2$ and 8.8% $Na_2O$, and mixed with 21.5 lbs. of ice water. To this slurry, 207 grams of of $NH_4H_2PO_4$ (Alpha Products) dissolved in 1500 grams of DI water was added. The resultant slurry was successively neutralized with 222 grams of 96.1% $H_2SO_4$ and 3.39 lbs aluminum sulfate (General Chemicals) solution containing 51.16 grams of $Al_2O_3$. To this gel-clay slurry, 1842.8 grams of the REY slurry (20.35% solids) was added and the catalyst is attrition resistant. In the test, 7.0 cc of catalyst sample is contacted in a 1.0 inch inside diameter U tube with an air jet formed by passing humidified (60%) air through a 0.07 inch nozzle at a velocity of 21 liters per minute for 1 hour. The AI results along with the physical properties of each catalyst are summarized in Table I.

TABLE I

| Catalysts of Examples | Physical/Chemical Properties and Attrition Resistance of Cracking Catalysts[1] | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Chemical Analysis (db) | | | | | | | | | | | | | |
| $SiO_2$ | 76.2 | 79.0 | 78.8 | N.D. | N.D. | 79.3 | N.D. | 77.5 | N.D. | 76.6 | 76.6 | 67.8 | N.D. |
| $Al_2O_3$ | 21.0 | 21.8 | 22.0 | N.D. | N.D. | 22.0 | N.D. | 21.6 | N.D. | 20.9 | 20.9 | 18.8 | N.D. |
| Na, ppm | 1270 | 995 | 1440 | 1190 | 1890 | 1855 | 3532 | 630 | 1850 | 1460 | 460 | 2600 | 26,300 |
| P, wt % | N.A. | 0.28 | 0.55 | 0.99 | 1.5 | 0.5 | 5.2 | 1.84 | 0.6 | N.D. | N.A. | 1.66 | 2.15 |
| $R_{E}_2O_3$ wt % | 2.6 | 2.7 | 3.0 | 3.0 | 2.5 | N.D. | 2.9 | 2.8 | N.D. | N.D. | 3.2 | 3.7 | 12.4 |
| Physical Properties[2] | | | | | | | | | | | | | |
| PV, cc/gm | 0.42 | 0.40 | 0.31 | 0.38 | 0.39 | 0.36 | 0.37 | 0.28 | 0.33 | 0.39 | — | 0.49 | N.D. |
| SA, $m^2$/gm | 123 | 106 | 109 | 106 | 69 | 89 | 71 | 89 | 100 | 117 | 119 | 97 | N.D. |
| UCS, Å ± 0.3 | 24.47 | 24.41 | 24.43 | 24.32 | 24.35 | 24.41 | 24.37 | 24.37 | 24.27 | 24.29 | 24.33 | 24.33 | N.D. |
| Median Particle Diam. (Microns) | 98 | 103 | 83 | 97 | 87 | 70 | 81 | 77 | 82 | 82 | 83 | 89 | 82 |
| Particle Size Dist. (weight %) | | | | | | | | | | | | | |
| 0–20 microns | 0.0 | 0.2 | 0.1 | 0.9 | 0.6 | 0.0 | 0.1 | 0.5 | 0.3 | 0.2 | 0.6 | 0.0 | 0.1 |
| 0–40 microns | 3.8 | 6.7 | 5.0 | 5.6 | 7.3 | 9.5 | 7.2 | 9.6 | 7.0 | 8.8 | 4.4 | 5.0 | 6.2 |
| 0–80 microns | 36.9 | 35.7 | 45.9 | 34.8 | 43.8 | 61.9 | 49.5 | 53.3 | 47.9 | 48.6 | 47.8 | 43.8 | 47.6 |
| Attrition Index | | | | | | | | | | | | | |
| a. As is "fresh" | 26 | 29 | 5 | 12 | 17 | 9 | 24 | 17 | 10 | 16 | 14 | 32 | 86 |
| b. Calcined[3] | 14 | 27 | 5 | 8 | 8 | 8 | 17 | 12 | 8 | 13 | 11 | 20[3] | N.D.[4] |
| c. Total (a + b) | 40 | 56 | 10 | 20 | 25 | 17 | 41 | 29 | 18 | 29 | 25 | 52 | N.D.[4] |

[1]All samples are $NH_4^+$ exchanged followed by overnight drying at 250° F.
[2]After 10 hour steaming at 1450° F., 45% steam. 0 psig.
[3]Air, 1200° F., 2 hrs.
[4]Not determined since catalyst did not survive attrition test.
N.D.: Not Determined
N.A.: Not Added homogenized. The resultant slurry was dewatered, to give reslurried and spray dried as described in Example 1.

EXAMPLE 13

This example describes the preparation of a REY catalyst in which the zeolite has been contacted with phosphate solution. The catalyst having the nominal composition (by weight) of 94% REY and 6% $P_2O_5$ was prepared as follows:

A batch of REY zeolite (Davison) weighing 375 grams (by dry weight) was mixed with 2.25 grams of Marasperse N-22 dispersant (Reed-Lignin Inc.) and 860 grams of DI water and ballmilled in a 1-gallon porcelain ballmill containing 7.8 pounds of ½ inch agate stone. After 16 hours, 626 grams of DI rinse water was added. Separately, a solution (solution C) containing 36.03 grams of $NH_4H_2PO_4$ ammonium dihydrogen phosphate (Alpha Products) dissolved in 260 grams DI water was prepared. The equivalent of 350 grams of REY (by dry weight) in the form of the balmilled slury was mixed with solution C for 30 minutes in a stirred vessel, homogenized and spray-dried as described in Example 1. The catalyst could not be tested in a fluidized bed (as described in Example 15), since after calcination the catalyst broke apart.

EXAMPLE 14

Each of the catalysts, prepared in Examples 1-13, were tested for their Attrition Index. The Attrition Index (AI) is defined as the percent of 0-20 micron fines generated during the test. The lower the AI the more Comparing the data in Table I for the phosphate treated catalysts of Examples 3, 4, 5, 6, 7, 8, 12 and 13, versus the non-phosphate treated control of Example shows attrition resistance is improved by phosphate pretreatment of either the REY zeolite (Examples 3, 4, 5) or the clay component (Example 6) or post impregnating the catalysts with a phosphate solution (Example 8). Whereas, no improvement is seen by phosphate treating the matrix (Example 7) or by adding phosphate solution to the slurry or when extremely high zeolite-containing microspheres are prepared by the preferred method.

A further comparison of the catalysts prepared in Examples 2, 3, 4 and 5 which contain the phosphate pretreated REY zeolite versus the non-phosphate treated control of Example 1, shows that the catalyst prepared in Example 2 did not show improved attrition resistance due to an insufficient amount of phosphorus being present.

Although an improved attrition resistance was observed in Example 6, the treatment of the clay component with $NH_4H_2PO_4$ prior to neutralization and mixing with the zeolite slurry, in accordance with Example 12, did not result in improved attrition resistance. Also, the treatment of the zeolite alone with a solution of $NH_4H_2PO_4$ solution prior to spray drying, as described in Example 13, resulted in a catalyst which after calcination did not even survive the Attrition Test.

Accordingly, the phosphate pretreatment of the REY zeolite, rather than phosphate treatment of other catalyst components such as the matrix or the zeolite/matrix mixture; and, the level of phosphate used in the pretreatment both influenced the improvement observed in attrition resistance of the various REY catalysts tested.

Additionally, catalysts prepared in accordance with Example 9 which contained phosphate treated USY zeolite, versus a control of Examples 10 and 11 also exhibited an improved attrition resistance.

EXAMPLE 15

To demonstrate the effect of phosphate treatment of the various catalytic components, the catalysts prepared in accordance with Examples 1–13 were evaluated in a fixed-fluidized bed (FFB) hydrocarbon catalytic cracking unit at a temperature of 760° F. and at a catalyst contact time of 1.0 minutes using Joliet Sour Heavy Gas Oil (JSHGO) as a feed and varying the catalyst to oil ratios. The JSHGO charge stock properties are given in Table II.

TABLE II

| Charge Stock | Joliet Sour Heavy Gas Oil (JSHGO) |
| --- | --- |
| Gravity, API | 24.3 |
| Aniline Pt., °F. | 171 |
| Hydrogen, wt % | 12.3 |
| Sulfur, wt % | 1.87 |
| Nitrogen, wt % | 0.10 |
| Basic Nitrogen, ppm | 327 |
| Conradson Carbon, wt % | 0.28 |
| Kinematic Viscosity at 210° F. | 3.6 |
| Bromine No. | 4.2 |
| R.I. at 70° F. | 1,5080 |
| Molecular Weight | 358 |
| Pour Point, °F. | 85 |
| Paraffins, wt % | 23.5 |
| Naphthenes, wt % | 32.0 |
| Aromatics, wt % | 44.5 |
| Aromatic Carbon, 25% | 18.9 |
| Ni, ppm | 0.3 |
| V, ppm | 0.6 |

The FFB results, after interpolation at the same conversion (65 vol % in Examples 1–8 and 11–12; 50 vol % in Examples 9 and 10), are summarized in Table III.

TABLE III

Effect of Phosphate Treatment on Catalytic Performance
(After 10 hours Steaming at 1450° F., 45% steam, 0 psig)

| Catalysts of Examples | 1 | 2 | 3 | 4 | 5 | 6 | 7 | 8 | 9 | 10 | 11 | 12 |
| --- | --- | --- | --- | --- | --- | --- | --- | --- | --- | --- | --- | --- |
| Conversion, Wt % (@ 65 vol %) | 62.5 | 62.2 | 62.3 | 62.1 | 62.1 | 62.3 | 62.4 | 62.3 | 48.3[1] | 48.4[1] | 62.5 | 62.3 |
| I. Product Yields | | | | | | | | | | | | |
| $C_5^+$ Gasoline, Wt % | 45.1 | 43.8 | 44.2 | 42.9 | 41.7 | 44.7 | 41.6 | 42.4 | 33.9 | 34.2 | 45.9 | 41.0 |
| Total $C_4$'s, Wt % | 7.9 | 9.4 | 8.9 | 9.6 | 9.8 | 8.0 | 10.3 | 10.1 | 7.3 | 7.1 | 8.3 | 9.4 |
| Dry Gas, Wt % | 6.6 | 6.7 | 6.8 | 7.1 | 7.8 | 7.0 | 7.1 | 7.2 | 5.8 | 5.3 | 6.6 | 8.7 |
| Coke, Wt % | 2.6 | 2.3 | 2.3 | 2.5 | 3.0 | 2.7 | 3.4 | 2.7 | 1.3 | 1.6 | 2.2 | 3.6 |
| II. Gasoline RON | 85.2 | 87.5 | 87.0 | 86.9 | 88.3 | 85.6 | 88.4 | 88.5 | 89.4 | 90.2 | 87.3 | 88.1 |
| III. Conversion, vol % @ 4:1 Cat:Oil | 75.6 | 73.1 | 74.1 | 73.3 | 66.4 | 77.0 | 64.4 | 65.4 | 50.6 | 4.4 | 69.1 | 66.6 |
| IV. $C_3/C_4$ Distribution | | | | | | | | | | | | |
| n-$C_4$, Wt % | 0.7 | 0.8 | 0.6 | 0.8 | 0.9 | 0.7 | 1.0 | 0.9 | 0.5 | 0.6 | 0.6 | 1.7 |
| i-$C_4$, Wt % | 3.8 | 4.0 | 4.2 | 4.6 | 5.0 | 3.8 | 5.3 | 4.8 | 2.8 | 2.7 | 3.8 | 3.7 |
| $C_4^=$, Wt % | 3.4 | 4.6 | 4.1 | 4.2 | 3.9 | 3.5 | 4.0 | 4.4 | 4.0 | 3.8 | 3.9 | 4.0 |
| $C_3$, Wt % | 3.6 | 3.4 | 3.6 | 3.5 | 3.8 | 3.8 | 3.5 | 3.5 | 3.0 | 3.0 | 3.7 | 4.8 |

[1]@ 50 vol % conversion.

As shown in Table III, the REY catalysts provide octane/yield shifts, relative to the untreated control of Example 1, which depend upon which catalyst component has been phosphate treated. The following observations are particularly noteworthy:

1. The catalysts containing the phosphate pretreated REY zeolites of Examples 2, 3, 4, and 5 of the present invention are superior to the other REY containing catalysts tested because they show a 1.7–3.1 octane gain.

2. The REY catalyst containing the phosphate treated clay component of Example 6 shows no observable difference in yield/octane performance.

3. The REY catalyst containing phosphate treated matrix of Example 7 provides higher octane, i-$C_4$ and $C_4^=$, but also provides a higher coke make.

4. The REY catalyst prepared in accordance with Example 12 shows higher octane but lower gasoline yield and higher dry gas and coke make relative to the catalysts of Examples 2–5. The catalyst of Example 13 was not tested in a fluidized bed (as described in Example 15), due to its extremely poor attrition resistance.

5. Surprisingly, in comparing the catalysts prepared in Examples 9 and 10, we note that the phosphate pretreatment of the USY zeolite prepared in Example 9 did not improve octane/yield performance, although improved conversion was observed.

6. Comparing the phosphate treated REY catalyst prepared in Examples 2–4 with the non-phosphate treated RE-USY catalyst prepared in Example 11, shows similar octane but the catalysts prepared in Examples 2–4 are more active, i.e. resulting in higher conversions while showing an equivalent dry gas and coke make, and also provide higher $C_4^=$, and i-$C_4$ yields.

Accordingly, these Examples demonstrate that phosphate pretreatment of REY zeolites during the initial deagglomeration step enhances the attrition resistance and the octane/yield performance of the catalyst containing the phosphate pretreated REY zeolite.

Thus, while we have described what are the presently contemplated preferred embodiments of the present invention, further changes and modifications could be made by those skilled in the art without departing from the spirit and scope of the invention and we have contemplated to claim all such changes and modifications.

We claim:

1. A process for preparing a zeolite containing catalyst for use in catalytic cracking, comprising:

(a) modifying a zeolite by treating the zeolite with a phosphate containing aqueous solution to form an aqueous mixture;

(b) directly combining said aqueous mixture containing phosphate modified zeolite with a matrix precursor to form a slurry; and (c) spray drying said slurry to form a catalyst.

2. The process recited in claim 1, wherein said phosphate containing solution is maintained at a pH from about 2 to about 6 during said modifying step, and includes a water soluble phosphate compound.

3. The process recited in claim 1, wherein said zeolite is selected from the group consisting of large pore zeolites, intermediate pore zeolites, and mixtures thereof.

4. The process recited in claim 3, wherein said large pore zeolites include X, Y, USY, REX, REY, RE-USY, dealuminated Y, silica-enriched dealuminated Y, said intermediate pore zeolites include ZSM-5, ZSM-11, ZSM-22, ZSM-23, ZSM-35, ZSM-48, ZSM-57, and said small pore zeolites include erionite and ZSM-34.

5. The process recited in claim 1, wherein said spray drying forms said catalyst having a diameter of less than 200 microns.

6. The process recited in claim 3, wherein said zeolite is an REY zeolite.

7. The process recited in claim 2, wherein said treatment of the zeolite with the phosphate containing solution includes deagglomerating the zeolite in the presence of the phosphate containing solution.

8. The process recited in claim 7, wherein said deagglomerating of the zeolite is accomplished by ballmilling to distribute the zeolite to a uniform slurry in the presence of the phosphate containing solution and intimately contact the phosphate containing solution with said zeolite.

9. The process recited in claim 2, wherein said water soluble phosphate compound includes an inorganic phosphate salt.

10. The process recited in claim 1, wherein treating said zeolite includes the addition of a dispersant and water.

11. The process recited in claim 9, wherein said phosphate containing solution is selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite and mixtures thereof.

12. The process recited in claim 2, wherein said phosphate containing solution includes from about 2 grams to about 15 grams of phosphate compound as phosphorus, per 100 grams of zeolite treated, by dry weight.

13. A catalyst prepared by a process, comprising:
(a) modifying an REY zeolite by treating the REY zeolite with a phosphate containing solution to form an aqueous mixture;
(b) directly combining said aqueous mixture containing the phosphate modified REY zeolite with matrix precursor; and
(c) forming and drying the catalyst.

14. A catalyst prepared by a process according to claim 13, wherein said modifying said REY zeolite is performed with an aqueous phosphate containing solution to form an aqueous mixture; and said aqueous mixture containing the phosphate modified REY zeolite is combined with said matrix precursor.

15. The catalyst recited in claim 13, wherein said phosphate containing solution is maintained at a pH from about 2 to about 6 during said modifying step and includes a water soluble phosphate compound.

16. The catalyst recited in accordance with claim 13, wherein said forming and drying step is accomplished by spray drying to form the catalyst having a diameter of less than 200 microns.

17. The catalyst recited in accordance with claim 15, wherein said treatment of the zeolite with the phosphate containing solution includes deagglomerating the zeolite in the presence of the phosphate containing solution.

18. A catalyst prepared by a process according to claim 17, wherein said deagglomerating of the zeolite is accomplished by ballmilling to distribute the zeolite to a uniform slurry in the presence of the phosphate containing solution and intimately contact the phosphate containing solution with said zeolite.

19. The catalyst recited in accordance with claim 15, wherein said water soluble phosphate compound includes an inorganic phosphate salt.

20. The catalyst recited in accordance with claim 13, wherein treating said zeolite includes the addition of a dispersant and water.

21. The catalyst recited in claim 15, wherein said phosphate containing solution is selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite and mixtures thereof.

22. The process recited in claim 15, wherein said phosphate containing solution includes from about 2 grams to about 15 grams of phosphate compound as phosphorus, per 100 grams of zeolite treated, by dry weight.

23. A process for catalytically cracking hydrocarbon feedstock, comprising contacting a hydrocarbon feedstock under fluid catalytic cracking conditions with a catalyst prepared by the process comprising:
(a) modifying a zeolite by treating the zeolite with a phosphate containing solution to form an aqueous mixture;
(b) directly combining said aqueous mixture containing phosphate modified zeolite with matrix precursor to form a slurry; and
(c) spray drying the slurry to form a catalyst.

24. The process recited in claim 23, wherein said phosphate containing solution is maintained at a pH from about 2 to about 6 during said modifying step and includes a water soluble phosphate compound.

25. The process recited in claim 24, wherein said zeolite is selected from the group consisting of large pore zeolites, intermediate pore zeolites, small pore zeolites and mixtures thereof.

26. The process recited in claim 25, wherein said large pore zeolites include X, Y, USY, REX, REY, RE-USY, dealuminated Y, silica-enriched dealuminated Y, said intermediate pore zeolites include ZSM-5, ZSM-11, ZSM-22, ZSM-23, ZSM-35, ZSM-48, ZSM-57, and said small pore zeolites include erionite and ZSM-34.

27. The process recited in claim 23, wherein said spray drying forms said catalyst having a diameter of less than 200 microns.

28. The process recited in claim 25, wherein said zeolite is an REY zeolite.

29. The process recited in claim 24, wherein said treatment of the zeolite with the phosphate containing solution includes deagglomerating the zeolite in the presence of the phosphate containing solution.

30. The process recited in claim 29, wherein said deagglomerating of the zeolite is accomplished by ball-milling to distribute the zeolite to a uniform slurry in the presence of the phosphate containing solution and intimately contact the phosphate containing solution with said zeolite.

31. The process recited in claim 21, wherein said water soluble phosphate compound includes an inorganic phosphate salt.

32. The process recited in claim 23, wherein treating said zeolite includes the addition of a dispersant and water.

33. The process recited in claim 31, wherein said phosphate containing solution is selected from the group consisting of ammonium monohydrogen phosphate, ammonium dihydrogen phosphate, triammonium phosphate, ammonium hypophosphate, ammonium orthophosphate, ammonium dihydrogen orthophosphate, ammonium monohydrogen orthophosphate, ammonium hypophosphite, ammonium dihydrogen orthophosphite and mixtures thereof.

34. The process recited in claim 24, wherein said phosphate containing solution includes from about 2 grams to about 15 grams of phosphate compound as phosphorus, per 100 grams of zeolite treated, by dry weight.

35. The process recited in claim 23, wherein said hydrocarbon feedstock has a higher average molecular weight and lower API gravity than gas oil.

36. The process recited in claim 23, wherein said hydrocarbon feedstock includes a higher metals content than gas oil.

* * * * *

UNITED STATES PATENT AND TRADEMARK OFFICE
CERTIFICATE OF CORRECTION

PATENT NO. : 5,110,776

DATED : May 5, 1992

INVENTOR(S) : G.K. Chitnis et al.

It is certified that error appears in the above-identified patent and that said Letters Patent is hereby corrected as shown below:

Col. 11, Line 8       insert --small pore zeolites--
cl. 3                 before "and"

Col. 13  Line 9       "21" should --24--
cl. 31

Signed and Sealed this

Thirteenth Day of July, 1993

Attest:

MICHAEL K. KIRK

Attesting Officer     Acting Commissioner of Patents and Trademarks